United States Patent
Gräßer et al.

(10) Patent No.: US 12,280,567 B2
(45) Date of Patent: Apr. 22, 2025

(54) MULTILAYER COMPOSITE, METHOD FOR THE PRODUCTION THEREOF AND ITS USE

(71) Applicant: DANZER GMBH, Baar (CH)

(72) Inventors: Johannes Gräßer, Dresden (DE); Aaron Schelter, Dresden (DE)

(73) Assignee: DANZER GMBH, Baar (CH)

( * ) Notice: Subject to any disclaimer, the term of this patent is extended or adjusted under 35 U.S.C. 154(b) by 0 days.

(21) Appl. No.: 16/883,483

(22) Filed: May 26, 2020

(65) Prior Publication Data

US 2020/0376817 A1    Dec. 3, 2020

(30) Foreign Application Priority Data

May 27, 2019  (DE) .......................... 102019114143.5

(51) Int. Cl.
*B32B 21/08*   (2006.01)
*B32B 3/30*    (2006.01)
(Continued)

(52) U.S. Cl.
CPC ................ *B32B 21/08* (2013.01); *B32B 3/30* (2013.01); *B32B 7/12* (2013.01); *B32B 21/14* (2013.01); *B32B 37/02* (2013.01); *B32B 38/06* (2013.01); *B32B 38/14* (2013.01); *F21V 3/062* (2018.02); *B32B 2307/202* (2013.01);
(Continued)

(58) Field of Classification Search
CPC ........... B32B 21/08; B32B 21/14; B32B 3/30; B32B 7/12; B32B 37/02; B32B 38/06; B32B 38/14; B32B 2307/202; B32B 2307/206; B32B 2307/41; B32B 2307/414; B32B 2451/00; B32B 2471/00;
(Continued)

(56) References Cited

U.S. PATENT DOCUMENTS 2,358,720 A * 9/1944 Larmour .................... B44C 1/26
                                                       411/968
3,698,978 A * 10/1972 McQuade ............... B32B 15/12
                                                       156/196
(Continued)

FOREIGN PATENT DOCUMENTS

DE        19945800      10/2000
DE      102016007217    12/2016
(Continued)

OTHER PUBLICATIONS

Zelinski, Peter, "Redefining Plastics Manufacturing," Modern Machine Shop, Jan. 9, 2012, https://www.mmsonline.com/articles/redefining-plastics-manufacturing (Year: 2012).*

(Continued)

*Primary Examiner* — Michael Zhang
(74) *Attorney, Agent, or Firm* — Sheridan Ross P.C.

(57) ABSTRACT

Multi-layer composite at least comprising: a decorative layer comprising a first decorative material and a second decorative material, the first and the second decorative material lying in one plane in the decorative layer and having the same thickness; and a first carrier layer for a glue layer, the first carrier layer comprising a plastic which is contained in a nonwoven or a fabric, wherein the decorative layer is planarly connected to the first carrier layer by the glue layer.

18 Claims, 2 Drawing Sheets

(51) Int. Cl.
  *B32B 7/12* (2006.01)
  *B32B 21/14* (2006.01)
  *B32B 37/02* (2006.01)
  *B32B 38/06* (2006.01)
  *B32B 38/14* (2006.01)
  *F21V 3/06* (2018.01)
  *F21W 121/00* (2006.01)

(52) U.S. Cl.
  CPC ..... *B32B 2307/206* (2013.01); *B32B 2307/41* (2013.01); *B32B 2307/414* (2013.01); *B32B 2451/00* (2013.01); *B32B 2471/00* (2013.01); *B32B 2479/00* (2013.01); *B32B 2605/08* (2013.01); *B32B 2605/12* (2013.01); *B32B 2605/18* (2013.01); *B32B 2607/02* (2013.01); *F21W 2121/00* (2013.01)

(58) Field of Classification Search
  CPC ............ B32B 2479/00; B32B 2605/08; B32B 2605/12; B32B 2605/18; B32B 2607/02; B44C 1/26
  See application file for complete search history.

(56) References Cited

U.S. PATENT DOCUMENTS

| | | | |
|---|---|---|---|
| 10,518,505 B2 * | 12/2019 | Graesser | B32B 7/00 |
| 2002/0031620 A1 * | 3/2002 | Yuzawa | B27D 1/00 |
| | | | 428/1.1 |
| 2002/0136862 A1 | 9/2002 | Dong et al. | |
| 2003/0057609 A1 | 3/2003 | Ratccliffe | |
| 2013/0213237 A1 * | 8/2013 | De Jong | A47J 31/20 |
| | | | 99/285 |
| 2016/0361896 A1 * | 12/2016 | Graesser | B32B 9/047 |

FOREIGN PATENT DOCUMENTS

| | | | | |
|---|---|---|---|---|
| EP | 914934 A1 * | 5/1999 | | B29C 59/02 |
| EP | 1424193 | 6/2004 | | |
| GB | 1382319 | 1/1975 | | |
| GB | 1382319 A * | 1/1975 | | B44C 1/26 |
| JP | 2015205467 A * | 11/2015 | | |
| JP | 2017136770 A * | 8/2017 | | B29C 45/14 |
| WO | WO-9906210 A1 * | 2/1999 | | B32B 21/08 |

OTHER PUBLICATIONS

Espacenet Translation of EP-914934-A1 (Year: 2022).*
Espacenet Translation of JP2015205467A (Year: 2024).*
Official Action with Machine Translation for China Patent Application No. 202010463061.7, dated May 16, 2024, 22 pages.

* cited by examiner

MULTILAYER COMPOSITE, METHOD FOR THE PRODUCTION THEREOF AND ITS USE

CROSS-REFERENCE TO RELATED APPLICATIONS

This application claims the benefit of German Patent Application No. 10 2019 114 143.5 filed May 27, 2019, the contents of which are incorporated herein by reference in its entirety.

FIELD OF THE INVENTION

The present invention relates to a multi-layer composite with a decorative layer which has inlays, the decorative layer being connected to a layer which has a plastic or consists of a plastic, and a method for producing the multi-layer composite. The invention also relates to the use of the multilayer composite. The invention further relates to a raw multilayer composite which is produced as an intermediate product in the manufacture of the multilayer composite.

BACKGROUND OF THE INVENTION

As is known, objects containing inlays can be produced by, for example, placing different woods on one another on a flat surface in such a way that a flat surface is created again, but which now contains differently colored and differently structured inclusions. For example, recesses can be made in a wood, preferably a veneer, into which the correspondingly cut other wood, for example also a veneer, but also another material such as a metal, can then be inserted. Such methods are complex and costly. Methods have therefore been proposed which should be technically simpler and more economical to implement.

GB 1 382 319 discloses a method for producing wood veneers with inlays, which can be made of metal, for example. The method involves pressing the metal into one side of the veneer until a surface of the metal is flush with the surface of the veneer. The other side of the veneer is supported during the pressing by a deformable layer in the pressing tool. The wood emerging on this side from the action of the metal is then removed by sanding until the metal being completely surrounded by wood becomes visible.

DE 10 2016 007 217 A1 discloses a multilayer composite having at least one decorative layer, comprising a first decorative material and a second decorative material, the first and the second decorative material lying in one plane in the decorative layer and having the same thickness; a first carrier layer for a glue layer, the first carrier layer comprising a plastic which is contained in a nonwoven or a fabric; wherein the decorative layer is connected to the first carrier layer by the glue layer.

OBJECT OF THE INVENTION

It is an object of the present invention to provide further inlaid objects which allow new applications.

SUMMARY OF THE INVENTION

This object could be achieved in that inlaid objects are produced such that plastic foils, which have a relief, are planarly pressed with decorative materials in the form of a veneer and the area of the veneer deformed by the relief is ground down at least as long until the plastic relief is visible on the surface of the veneer.

Depending on the properties of the plastic foil used, decorative surfaces can be produced, which can also have a technical function. If, for example, plastic foils with a relief in the form of a pictogram are used in the method according to the invention, decorative surfaces can be produced which have pictograms. If such plastic foils are transparent, decorative surfaces are accessible which have transparent pictograms that can be illuminated if necessary.

In a first aspect, the invention thus relates to a multilayer composite at least comprising: a decorative layer comprising a first decorative material and a second decorative material, the first decorative material having a veneer and the second decorative material having a plastic foil which has a relief; wherein the veneer and the plastic foil are planarly connected to one another in such a manner that the relief of the foil penetrates the veneer, wherein the height of the relief is equal to the thickness of the veneer.

In a particularly preferred embodiment, the veneer and the plastic foil are connected to one another by an adhesive in the multilayer composite.

In a second aspect, the invention relates to a method for producing a multilayer composite as defined in the first aspect, comprising at least steps: (A) planarly contacting a first decorative material, which has a veneer, with a second decorative material, which has a plastic foil, which has a relief; (B) pressing the first decorative material with the second decorative material in a pressing device in such a way that the relief of the plastic foil penetrates the veneer and deforms a region of the veneer, the pressing device being configured such that it has a deformable press pad which allows to receive the area deformed by the relief of the plastic foil in the veneer, the first and the second decorative material forming a deformed decorative layer; (C) removing the pressed composite of step (B) from the pressing device; (D) removing the deformed area of the decorative layer at least until the height of the relief of the plastic foil in the multilayer composite is equal to the thickness of the veneer.

Preferably, an adhesive is applied to the veneer or the plastic foil or the veneer and the plastic foil prior to the planarly contacting in step (A) or inserted between the veneer and the plastic foil.

In a third aspect, the invention relates to the use of a multilayer composite as defined in the first aspect, or the use of a multilayer composite produced by a method as defined in the second aspect, in furniture, vehicle, ship and aircraft construction and for the manufacture of wall panels, interior fittings, floors, housings or decorative elements.

Accordingly, this aspect also relates to a method which comprises: installing a multi-layer composite as defined in the first aspect, or installing a multi-layer composite produced by a method as defined in the second aspect, in furniture, vehicles, ships, aircraft, wall panels, interior fittings, Floors, housing or decorative elements.

In a fourth aspect, the invention relates to a (raw) multilayer composite, which is formed as an intermediate in the production of the multilayer composite as defined in the first aspect. Accordingly, the invention relates to a multilayer composite, at least comprising: a decorative layer comprising a first decorative material and a second decorative material, the first decorative material having a veneer and the second decorative material having a plastic foil which has a relief; wherein the veneer and the plastic foil are planarly connected to one another in such a way that the relief of the foil penetrates the veneer such that at least a region of the first decorative material is deformed by the relief of the plastic foil.

This multilayer composite can be produced by a method, at least comprising steps (A) to (C) as defined in the second aspect.

In a fifth aspect, the invention relates to an embossing die for embossing the relief of the plastic foil, the embossing component of the embossing die having a material which is configured such that any trapped air can escape from the embossing die through pores in the material.

BRIEF DESCRIPTION OF THE FIGURES

Those of skill in the art will recognize that the following description is merely illustrative of the principles of the invention, which may be applied in various ways to provide many different alternative embodiments. This description is made for illustrating the general principles of the teachings of this invention and is not meant to limit the inventive concepts disclosed herein. The accompanying drawings, which are incorporated in and constitute a part of the specification, illustrate embodiments of the invention and together with the general description of the invention given above and the detailed description of the drawings given below, serve to explain the principles of the invention.

DETAILED DESCRIPTION OF THE INVENTION

Figure 1:
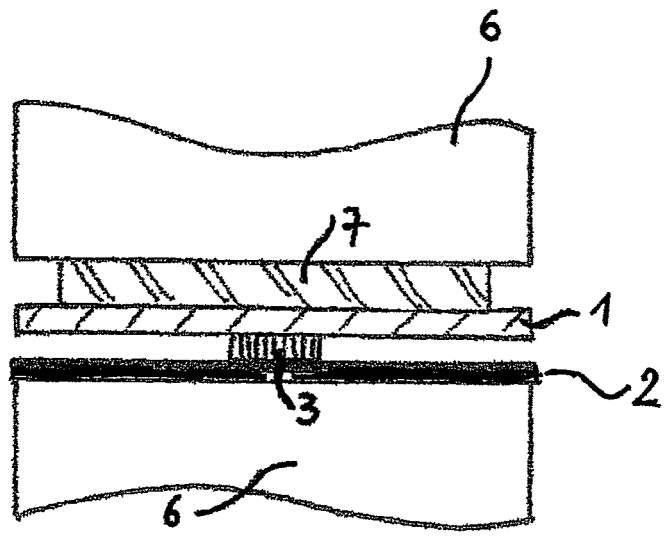
FIG. 1 the equipping of a press device which has press jaws or press plates with starting materials to produce a multilayer composite according to the invention.

In the following, the terms defined in quotation marks and closing characters are in the meaning of the invention.

In a first aspect, the invention relates to a multilayer composite at least comprising: a decorative layer comprising a first decorative material and a second decorative material, the first decorative material having a veneer and the second decorative material having a plastic foil which has a relief; wherein the veneer and the plastic foil are planarly connected to one another in such a way that the relief of the foil penetrates the veneer, the height of the relief being equal to the thickness of the veneer.

The term "multilayer composite" means a composite of different materials which are arranged in layers one above the other or one below the other, wherein a composite is formed, namely the multilayer composite of the present invention.

The terms "decorative layer" or "decorative surface" mean a layer or surface which is effective, decorative, efficient or ornamental. In general, this impression will be subjective to the viewer.

The term "decorative material" means an object in any composition and shape, which is effective, decorative, efficient or ornamental. In general, this impression will also be subjective to the viewer.

The term "material" means an object in any composition and shape. Materials that are used according to the invention are preferably wood, preferably in the form of a veneer, and a plastic foil.

Due to the subjectivity of the term "decorative", the terms "decorative layer", "decorative surface" and "decorative material" ("first decorative material", "second decorative material") in the meaning of the invention are also only used in the meaning of "layer" and "material" ("first material", "second material").

The invention thus also relates to a multilayer composite at least comprising: a layer comprising a first material and a second material, the first material having a veneer and the second material having a plastic foil which has a relief; wherein the veneer and the plastic foil are planarly connected to one another in such a way that the relief of the foil penetrates the veneer, the height of the relief being equal to the thickness of the veneer.

In one embodiment, the first decorative material consists of a veneer.

In a further embodiment, the second decorative material consists of a plastic foil which has a relief.

In a further embodiment, the first decorative material consists of a veneer and the second decorative material consists of a plastic foil which has a relief.

In one embodiment, the multilayer composite consists of the decorative layer.

The multilayer composite is not limited to two decorative materials (or two materials), but can have any number of decorative materials, that is, a first decorative material, a second decorative material, a third decorative material, a fourth decorative material, a fifth decorative material, etc.

According to the invention, the first decorative material is made of wood or has wood, namely wood in the form of a veneer.

The term "veneer" includes sheets of wood with a thickness between 0.1 mm and 6 mm, preferably 0.1 to 2 mm, more preferably 0.1 mm to 1 mm or less than 0.8 mm.

According to the invention, the second decorative material consists of a plastic foil which has a relief, or this material has a plastic foil which has a relief.

In one embodiment, in addition to the veneer and the plastic foil, a further material selected from wood, metal, plastic, ceramic, leather, paper, glass, carbon, pigments or dyes or two or more can be present in the multilayer composite.

Glass or carbon can be in the form of glass fibers or carbon fibers.

In a preferred embodiment, there is an adhesive to improve the adhesion between the first decorative material and the second decorative material.

In a particularly preferred embodiment, there is an adhesive in the multilayer composite between the veneer and the plastic foil.

Thus, in one embodiment, in a multilayer composite, the veneer and the plastic foil are connected to one another by an adhesive.

The term "adhesive" includes all substances with which the adhesion between the veneer and the foil can be improved.

The first decorative material and the second decorative material can be arranged in any way in the decorative layer, as long as the veneer and the plastic foil are planarly connected to one another in such a way that the relief of the foil penetrates the veneer, the height of the relief being equal to the thickness of the veneer.

The term "as long as the height of the relief is equal to the thickness of the veneer" allows deviations of the decorative materials from each other by up to $\frac{1}{10}$ mm.

The term "height of the relief" means the distance between an upper imaginary boundary surface of the relief and a lower imaginary boundary surface of the relief, between which the relief is located.

The term "thickness of the veneer" means the shortest distance between the top side and the bottom side of the veneer.

The term "wherein the veneer and the plastic foil are planarly connected to one another in such a way that the relief of the foil penetrates the veneer, the height of the relief being equal to the thickness of the veneer" means that the veneer and the relief of the plastic foil represent the inlays, which are arranged one inside the other such that a planar surface is created again, the different areas of the flat surface having different properties due to the veneer portion and the plastic portion.

The term "inlay" means a decoration technique in the form of inlay work, in which different materials as defined herein are superimposed in such a way that a flat surface is created again after the processing as defined here, the different areas of the flat surface being due to the veneer portion and the plastic portion have different properties.

In one embodiment, the relief of the second decorative material is fully surrounded by the first decorative material.

In a further embodiment, the relief of the plastic foil of the second decorative material is not fully surrounded by the first decorative material, i.e. it is only partially surrounded by it.

In one embodiment, the first decorative material is planarly configured, and the relief of the plastic foil of the second decorative material in the multilayer composite is also planar.

In a further embodiment, the first decorative material is planar, and the relief of the plastic foil of the second decorative material in the multilayer composite is linear or elongated.

In a further embodiment, the first decorative material is planar, and the relief of the plastic foil of the second decorative material in the multilayer composite is punctiformly configured.

In one embodiment, the dimensions of the plastic foil in the multilayer composite are such that they correspond to the dimensions of the veneer, i.e. that veneer and plastic foil are congruently planarly connected.

In a further embodiment, the dimensions of the plastic foil in the multilayer composite are such that its area is smaller than the area of the veneer.

In a further embodiment, a plurality of plastic foils, each of which has a relief, are planarly connected to the veneer, the foils being arranged next to one another.

In one embodiment, the foil in the multilayer composite contains, in addition to the relief which penetrates the veneer, a further relief which does not penetrate the veneer. The height of this additional relief is therefore smaller than the thickness of the veneer.

The term "foil" means a plastic sheet.

In one embodiment, the term "foil" means a thin sheet of plastic. In one embodiment, the thickness of the plastic foil or sheet is <1 mm excluding the height of the relief.

In a further embodiment, the thickness of the plastic foil or sheet is >1 mm excluding the height of the relief.

The plastic can thus also be in the form of a plastic sheet in a multilayer composite.

The terms "plastic foil" and "plastic sheet" are used herein interchangeably.

The plastic foil in turn can be in the form of a multilayer composite of several foils, which can be the same or different from one another. Metal or carbon foils or sheet-like textiles or layers of leather, paper or pigments can also be incorporated into such a multilayer composite. The use of preferably gold leaf in one layer or as one layer is possible. It is also possible to apply one or more layers of paint to one or more of the foils. The use of organic materials such as plants or plant components is also possible.

The term "sheet-like textiles" means fabrics, knitted fabrics, knotted fabrics, braids, stitch-bonded fabrics, nonwovens and felts.

Such multilayer composites are either known and/or can be produced by known processes by coating, laminating or extruding or by printing processes.

In one embodiment, the plastic foil is transparent and transmissive to light, i.e. it is transparent.

In a further embodiment, the multilayer composite is also permeable to light via the relief of the plastic foil.

In a further embodiment, the plastic foil is only partially transparent and partially transparent to light, i.e. it is translucent.

In another embodiment, the plastic foil is opaque and opaque to light, i.e. it is opaque.

In one embodiment, the multilayer composite has a source of light that is configured to illuminate the transparent or translucent relief that penetrates the veneer.

In the embodiment in which the foil in the multilayer composite has, in addition to the relief which penetrates the veneer, a further relief which does not penetrate the veneer, and the height of this further relief being smaller than the thickness of the veneer, depending on the height of the further relief, the veneer lying above this relief may be at least partially shined through by the light source.

Areas can thus be presented in the multilayer composite that can be shined through to different extents, namely areas that can be shined through completely or weakened in the plastic inlay due to the transparent or translucent nature of the plastic inlay, or areas that can be shined through in the veneer inlay due to the transparent or translucent plastic relief that is located under the veneer.

These areas which can be shined through to different degrees can be used for aesthetic purposes as well as for information transmission.

In one embodiment, the plastic foil, particularly the relief of the plastic foil, has sensor elements.

In another embodiment, the sensor elements can also be attached to or in areas other than the relief of the plastic foil.

In a further embodiment, the sensor elements can also be applied in layers of the multilayer composite which are different from the layer of the plastic foil with relief.

The term "sensor elements" includes all elements that can be used to determine physical quantities such as length, mass, force, pressure, electrical current, temperature, time, electrical capacity, electrical resistance or light intensity. In one embodiment, the sensor element has conductor tracks.

In one embodiment, the plastic foil is electrically insulating.

In a further embodiment, the plastic foil is electrically conductive.

In a further embodiment, the relief of the plastic foil is printed in whole or in part, it being possible for single-color or multi-color printed areas to be present.

In a further embodiment, the foil is printed in whole or in part, it being possible for single-color or multi-color printed areas to be present.

In one embodiment, a translucent foil is used to produce the multilayer composite, the foil being printed on the relief side in such a way that the printed foil is opaque. After the multilayer composite has been made as disclosed in the second aspect of the invention, consequently only the regions of the relief which penetrate the veneer are transparent to light, since the printing ink located on the relief is removed.

In further embodiments, a translucent foil is used to produce the multilayer composite, color being applied to the relief side of the foil such that the foil is opaque, and the color application being applied differently than by printing. Preferably, the paint can be applied by knife coating, brushing or spraying. Color application by spraying is particularly preferred. After the multilayer composite has been made as disclosed in the second aspect of the invention, only the regions of the relief that penetrate the veneer are consequently permeable to light, since the color on the relief is removed.

In a further embodiment, a translucent plastic foil is used to produce the multilayer composite, on which an opaque foil is laminated on the relief side such that the laminated foil is opaque. After the multilayer composite has been made as disclosed in the second aspect of the invention, only the regions of the relief which penetrate the veneer are consequently transparent to light, since the laminated foil located on the relief is removed.

In a further embodiment, the foil is colored with a dye.

In one embodiment, the foil is colored with a fluorescent dye.

In a further embodiment, the foil is light scattering or tinted.

In one embodiment, the relief in the plastic foil is in the form of a pictogram.

The term "pictogram" means a single symbol that conveys information through a simplified graphic representation. A pictogram can consist of an iconic representation of objects, scenes, abstract symbols, numbers or text elements.

The term "relief" means an image that is raised out of the plastic foil surface or deepened into it.

The term "plastic" means an organic polymeric solid which is produced synthetically or semi-synthetically from monomeric organic molecules or from biomolecules. The plastic can be a thermoplastic or a thermoset.

All known plastics can be used, provided that they can be processed in foil form (or sheet form) and can be provided with a relief which is sufficiently stable to ensure the implementation of the method according to the invention as defined in the second aspect.

Preferred plastics are selected from the group consisting of polyolefin, polyvinyl chloride, polystyrene, polycarbonate, polylactide, cellulose acetate and starch blends.

Other suitable plastics are polyether, polyamide, polysulfone, polyimide, polyacrylate and polymethacrylate, preferably polymethyl methacrylate, polyacrylonitrile, polybutadiene, acrylonitrile-butadiene-styrene polymers and polyurethane (PU).

Other plastics are copolymers of the plastics mentioned.

Preferred plastics are acrylonitrile-butadiene-styrene polymers, polycarbonates, polymethacrylates, preferably polymethyl methacrylates.

In a particularly preferred embodiment, the plastic foil has polycarbonate or consists of polycarbonate.

In one embodiment, the decorative layer of the multilayer composite has a thickness of 2 mm or less, preferably 1 mm or less or less than 0.8 mm.

In one embodiment, the thickness of the multilayer composite is in the range from 0.4 to 0.6 mm.

In a second aspect, the invention relates to a method for producing the multilayer composite according to the invention as defined in the first aspect.

The method comprises at least steps (A) to (D): (A) planarly contacting a first decorative material, which has a veneer, with a second decorative material, which has a plastic foil, which has a relief; (B) pressing the first decorative material with the second decorative material in a pressing device in such a way that the relief of the plastic foil penetrates the veneer and deforms a region of the veneer, the pressing device being configured such that it has a deformable press pad which allows to receive the area deformed by the relief of the plastic foil in the veneer, the first and the second decorative material forming a deformed decorative layer; (C) removing the pressed composite of step (B) from the pressing device; (D) removing the deformed area of the decorative layer at least until the height of the relief of the plastic foil in the multilayer composite is equal to the thickness of the veneer.

An adhesive is preferably applied to the first decorative material or the second decorative material or the first and the second decorative material before the planarly contacting of step (A).

In a preferred embodiment, an adhesive is applied to the veneer or the plastic foil or the veneer and the plastic foil prior to the planarly contacting in step (A).

The adhesive can be in solid or liquid form.

The adhesive can be applied punctiformly or planarly.

In a preferred embodiment, the adhesive is a glue.

Adhesives with which plastics and wood can be glued together are known.

In one embodiment, hot melt adhesives, isocyanate group-containing one-component adhesives, isocyanate group-containing two-component adhesives, cyanoacrylates, dispersion adhesives or epoxy resins can be used. The use of a polyurethane adhesive is preferred.

Hot melt adhesives can be based on polyethylene, amorphous poly-α-olefins, ethylene vinyl acetate copolymers, polyester elastomers, polyurethane elastomers, copolyamide elastomers, and vinyl pyrrolidone/vinyl acetate copolymers.

In one embodiment, the adhesive may be in sheet form.

The foil is then placed between the veneer and the plastic foil, which has a relief, before the planarly contacting according to step (A).

Preferably, thermoplastic polyurethane foils can be used.

The adhesive can also be present as an adhesive foil.

The term "adhesive foil" means a foil that adheres to both the veneer and the plastic foil in the multilayer composite.

In one embodiment, the adhesive foil is a polyolefin or polyvinyl chloride (PVC) foil.

If necessary, tackifiers can be added to the adhesive foil, preferably based on polybutadiene.

Preferably, the thickness of the adhesive foil is in the range of 5 to 50 microns.

The adhesive foil is then placed prior to the planarly contacting according to step (A) between the veneer and the plastic foil, which has a relief.

According to the invention, in step (A) a plastic foil is used, which has a relief.

The plastic foil can be present as an embossed or milled foil in the manufacture of the multi-layer composite, i.e. the relief of the foil can be produced by known techniques, namely by milling or embossing, preferably by embossing.

The relief of the plastic foil can also be generated by other methods that are known in the prior art, preferably by calendering using profile rollers, by injection molding, injection stamping or by printing.

In one embodiment, the relief is generated by additive manufacturing processes such as 3D printing.

Accordingly, the method comprises prior to step (A), the production of the second decorative material in the form of a plastic foil, which has a relief, the relief of the foil being formed by milling, embossing, calendering using profile rollers, by injection molding, injection stamping or by printing.

The relief is preferably produced by embossing.

Preferably, an embossing die is used when embossing the relief, the embossing component of the embossing die having a material that is configured such that any trapped air can escape through pores in the material from the embossing die during embossing.

Otherwise, any trapped air could affect the formation of the relief when embossing.

In one embodiment, an embossing mold is used when embossing the relief, the embossing component of the embossing mold having a material selected from the group consisting of: sintered metal, sintered polymer, porous ceramic, porous aluminum, metal foams or polymer foams.

Such materials are known or can be produced by known processes.

The terms "deformed area" and "deformed decorative layer" of step (B) denote a curved area, respectively a curved layer.

The term "removing the deformed area of the decorative layer until the height of the relief of the plastic foil is equal to the thickness of the veneer" means that the surfaces of the veneer and the plastic foil, i.e. the respective tops and the respective undersides, each lying in one plane, with a tolerable deviation of $\frac{1}{10}$ mm, such that the relief is fully visible.

The term "removal" preferably means grinding, planing or milling.

The removal can be done both manually and by machine, with mechanical removal being preferred in the sense of economical production.

The term "press device" means any device which is suitable for carrying out stage (B). Such pressing devices preferably have pressing jaws between which the materials provided to produce the multilayer composite are positioned in a suitable manner. The term "press jaw" is used synonymously with the term "press plate".

The term "press pad" preferably means a material which, due to its deformability under pressure, is suitable for transferring over the entire surface to the multilayer composite to be produced, i.e. distribute the pressure as evenly as possible.

In one embodiment, a hydraulic press pad or a pneumatic press pad is used.

Static press pads, membrane press pads and air pads can be used.

Suitable materials for the press pad of the press device can preferably be selected from deformable materials such as rubber, silicone, polyurethane, materials which have cellulose fibers, such as paper, preferably kraft paper, or cardboard, or also from wood-based materials.

The pressing jaws of the pressing device can have a plastic foil to protect the multilayer composite from damage. Such a plastic foil can also prevent the multilayer composite from adhering to the pressing tool.

In one embodiment, the press pad is firmly anchored in the press device.

In a further embodiment, the press pad can be removed from the press device. In this embodiment, the press pad can preferably adhere to the deformed decorative layer after the pressing in step (B) and can be removed from the pressing device in step (C) together with the multilayer composite that has not yet been ground. After removing the adhering press pad, the raw multilayer composite can then be ground down according to step (D).

The pressure used in the pressing process is preferably in the range from 1 to 30 $N/mm^2$, preferably 2 to 20 $N/mm^2$, more preferably 5 to 10 $N/mm^2$.

The temperature at the active site is preferably in the range of the ambient temperature, i.e. preferably in the range from 10° C. to 40° C.

If necessary, higher temperatures can be used in the pressing process, preferably from 50 to 180° C.

In a preferred embodiment, the pressure is in the range of 5-10 $N/mm^2$ and the temperature in the range of 10-150° C.

The pressing time is preferably in the range from 30 to 360 seconds.

FIG. 1 shows the equipping of a press device, which has press jaws or press plates 6 and a press pad 7, with a first and a second decorative material. The first decorative material is a veneer 1, under which a second decorative material 2 in the form of a plastic foil is positioned, wherein the plastic foil has a raised relief 3. An adhesive can also be applied to the veneer or the plastic foil in a punctual or planar manner, preferably in the form of an adhesive or a foil (not shown).

Figure 2:
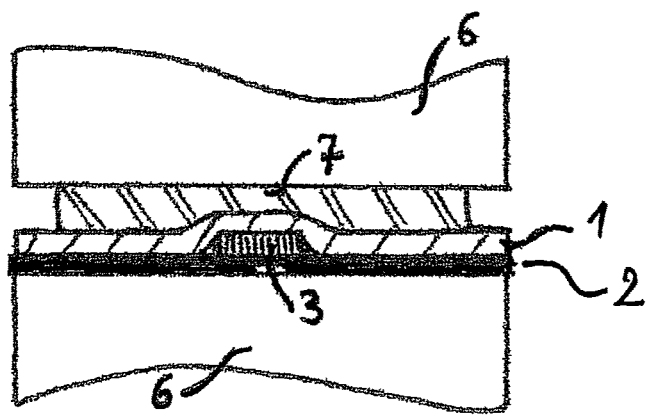
FIG. 2 the closing of the pressing device or the pressing jaws of the pressing device under the action of pressure.

FIG. 2 shows the closing of the press under the action of pressure, the relief 3 of the plastic foil 2 penetrating the veneer 1 and deforming it.

Figure 3:
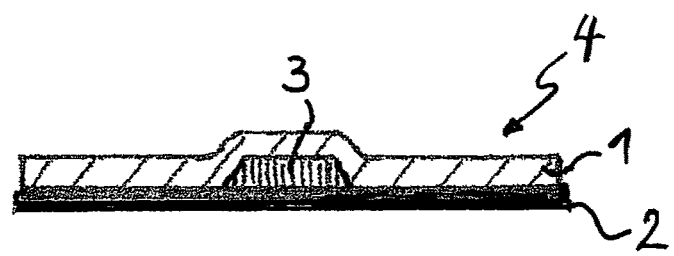
FIG. 3 the pressed raw multilayer composite of the invention.

FIG. 3 shows the pressed raw multilayer composite 4, which was removed from the pressing device after the opening of the pressing jaws 6. The relief 3 of the second decorative material, namely the plastic foil 2, penetrates the first decorative material, namely the veneer 1, and deforms it, forming a deformed decorative layer. A surface of the first and second decorative materials lie in one plane.

Figure 4:
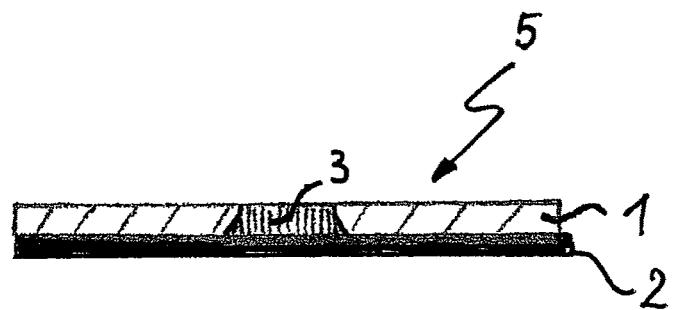
FIG. 4 the ground multi-layer composite of the invention.

FIG. 4 shows the ground multi-layer composite 5, which arises from the fact that the deformed area of the decorative layer of the pressed raw multi-layer composite 4 is sanded until the height of the relief 3 is equal to the thickness of the first decorative material 1, wherein the plastic foil 2 and the veneer 1 are planarly connected to one another.

In a third aspect, the invention relates to the use of a multilayer composite as defined in the first aspect, or a multilayer composite produced by a method as defined in the second aspect.

The multilayer composite can be used in furniture, vehicle, ship and aircraft construction and to produce wall panels, interior fittings, floors, housings and decorative elements.

Accordingly, this aspect also relates to a method which comprises: installing a multi-layer composite as defined in the first aspect, or installing a multi-layer composite produced by a method as defined in the second aspect, in furniture, vehicles, ships, airplanes, wall panels, interior fittings, floors, housings or decorative elements.

The multi-layer composites according to the invention or the multi-layer composites produced by the method according to the invention can advantageously be applied to single-curved or slightly double-curved surfaces if necessary, since the plastic foil generally allows the multi-layer composite to be bent without tearing the decorative materials and thus ensures good bending stability and transverse tensile strength.

In a fourth aspect, the invention relates to the pressed raw multilayer composite, as is shown by way of example in FIG. 3.

Accordingly, the invention relates to a multilayer composite at least comprising: a decorative layer comprising a first decorative material and a second decorative material, the first decorative material having a veneer and the second decorative material having a plastic foil which has a relief; wherein the veneer and the plastic foil are connected to one another in such a way that the relief of the foil penetrates the veneer in such that at least a region of the first decorative material is deformed by the relief of the plastic foil.

The term "that at least a portion of the first decorative material is deformed by the second decorative material" means that in the decorative layer the second decorative material is at least partially covered by the first decorative material, i.e. that the second decorative material does not fully penetrate the first decorative material.

The term "deformed" is used synonymously with the term "deformed".

In a further embodiment, this raw multilayer composite has on the deformed decorative layer the press pad of the press device. This press pad adhering to the raw multilayer composite can be removed from it.

In one embodiment, the press pad is present on the multilayer composite in the form of a removable layer.

The raw multilayer composite can be produced by a process which has at least the steps (A) to (D) defined in the second aspect, but not the step (E).

In a fifth aspect, the invention relates to an embossing die, the embossing component of the embossing die having a material which is set up in such a way that any trapped air can escape from the embossing die through pores in the material.

In one embodiment, the material is selected from the group consisting of: sintered metal, sintered polymer, porous ceramic, porous aluminum, metal foam and polymer foam.

The materials mentioned are known or can be prepared by known methods. In one embodiment, the invention relates to an embossing die, wherein the embossing component of the embossing die has a material that is configured such that any trapped air can escape through pores in the material from the embossing die when a relief in a plastic foil is embossed.

LIST OF REFERENCE SYMBOLS 1 first decorative material in the form of a veneer
2 second decorative material in the form of a plastic foil
3 relief of the plastic foil
4 multi-layer composite with deformed decorative layer
5 ground multi-layer composite
6 press jaws or press plates of a press device
7 press pads

What is claimed is:

1. A multilayer composite comprising:
  a decorative layer comprising a first decorative material and a second decorative material, the first decorative material having a veneer and the second decorative material having a plastic foil that has a relief,
  wherein the relief is an image that is raised out of a surface of the plastic foil or deepened into it,
  wherein a remaining portion of the surface of the plastic foil is at a first height and the relief is at a second height different from the first height,
  wherein the veneer and the plastic foil are planarly connected to one another in such a way that the relief of the plastic foil penetrates the veneer such that an upper edge of the relief contacts a top edge of the veneer, wherein the second height of the relief is equal to a thickness of the veneer,
  wherein the plastic foil with the relief is present as a milled or embossed foil, as a calendared foil, as an injection-molded foil, or as an injection-stamped foil,
  wherein an adhesive is positioned between the veneer and the plastic foil, and
  wherein the adhesive is present as an adhesive foil.

2. The multilayer composite according to claim 1, wherein the adhesive foil is a thermoplastic polyurethane foil, a polyolefin foil, or a polyvinyl chloride (PVC) foil.

3. The multilayer composite according to claim 1, wherein the plastic foil contains, in addition to the relief that penetrates the veneer, a second relief that does not penetrate the veneer, and wherein a height of the second relief is smaller than the thickness of the veneer.

4. The multilayer composite according to claim 1, wherein the plastic foil is in a form of a second multilayer composite of a plurality of plastic foils that are identical or different from one another, wherein one or more further materials may be present in the second multilayer composite and selected from wood, metal, plastic, ceramic, leather, paper, glass, carbon, pigments, organic materials, or dyes.

5. The multilayer composite according to claim 4, wherein the plastic foil has one or more sensor elements.

6. The multilayer composite according to claim 1, wherein the plastic foil is transparent, translucent, or opaque and the relief is transparent, translucent, or opaque.

7. The multilayer composite according to claim 6, further comprising a source of light that is configured to illuminate the transparent, translucent, or opaque relief.

8. The multilayer composite according to claim 1, wherein the plastic foil has a dye.

9. The multilayer composite according to claim 1, wherein the plastic foil is electrically insulating or electrically conductive.

10. The multilayer composite according to claim 1, wherein the relief of the plastic foil is in a form of a pictogram.

11. The multilayer composite according to claim 1, wherein the plastic foil with the relief is present as an embossed foil.

12. The multilayer composite according to claim 1, wherein a plastic of the plastic foil is selected from the group consisting of:
  polyolefin, polyvinyl chloride, polystyrene, polycarbonate, polylactide, cellulose acetate, starch blends, polyether, polyamide, polysulfone, polyimide, polyacrylate, polyacrylonitrile, polybutadiene, polyurethane, polymethacrylate, polymethyl methacrylate, acrylonitrile-butadiene-styrene polymers, and copolymers of at least one of the aforementioned plastics.

13. The multilayer composite according to claim 1, wherein the relief is part of the plastic foil such that the relief is integral with the plastic foil, and wherein the relief and the plastic foil are fabricated from a same material.

14. The multilayer composite according to claim 1, wherein the adhesive foil is in a range of 5 to 50 microns.

15. The multilayer composite of claim 1, wherein a lower surface of the veneer is positioned directly on an upper surface of the plastic foil.

16. A method comprising: installing a multilayer composite as defined in claim 1 in furniture, vehicles, ships, aircraft, wall panels, interior fittings, floors, housings, or decorative elements.

17. A multilayer composite comprising:
  a decorative layer comprising a first decorative material and a second decorative material, the first decorative material having a veneer and the second decorative material having a plastic foil that has a relief,
  wherein the relief is an image that is raised out of a surface of the plastic foil or deepened into it, wherein the relief is formed from a first portion of the plastic foil, and the surface of the plastic foil remaining that surrounds the formed relief is a second portion of the plastic foil, wherein the veneer and the plastic foil are planarly connected to one another in such a way that the relief formed from the first portion of the plastic foil penetrates the veneer such that an upper edge of the relief contacts a top edge of the veneer, wherein a height of the relief formed from the first portion of the plastic foil is equal to a thickness of the veneer, wherein the first portion of the plastic foil with the relief is present as a milled or embossed foil, as a calendared foil, as an injection-molded foil, or as an injection-stamped foil, wherein an adhesive is positioned between the veneer and the plastic foil, and wherein the adhesive is present as an adhesive foil.

18. The multilayer composite of claim 17, wherein a lower surface of the veneer is positioned directly on the adhesive foil, and the adhesive foil is positioned directly on an upper surface of the plastic foil.

* * * * *